United States Patent

[11] 3,602,225

[72] Inventor Edward A. Wielicki
 Philadelphia, Pa.
[21] Appl. No. 822,735
[22] Filed May 7, 1969
[45] Patented Aug. 31, 1971
[73] Assignee FMC Corporation
 Philadelphia, Pa.

[54] BIODEGRADABLE ABSORBENT PAD
 9 Claims, No Drawings
[52] U.S. Cl. .................................................. 128/287,
  117/76, 161/269, 264/193
[51] Int. Cl. ....................................................... A61f 13/16
[50] Field of Search ........................................... 128/284,
  287, 288, 290, 296, 155–156; 117/76, 138.8, 145;
  264/193, 195, 211, 343; 161/269

[56] References Cited
 UNITED STATES PATENTS

| | | | |
|---|---|---|---|
| 2,467,436 | 4/1949 | Lanning .................. | 117/76 |
| 2,972,545 | 2/1961 | Briskin .................... | 128/156 X |
| 3,034,922 | 5/1962 | Boe .......................... | 128/284 X |
| 3,052,237 | 9/1962 | Chand ...................... | 128/156 |
| 3,090,694 | 5/1963 | Pereny .................... | 128/132 X |
| 3,123,075 | 3/1964 | Stamberger ............. | 128/287 |

*Primary Examiner*—Charles F. Rosenbaum
*Attorneys*—Thomas R. O'Malley, George F. Mueller and Robert G. Hoffmann

ABSTRACT: A disposable, absorbent pad containing biodegradable absorbent filler and a highly biodegradable cellulose moisture barrier film is disclosed herein.

BIODEGRADABLE ABSORBENT PAD

It is known to provide absorbent pads including sanitary napkins and diapers with fluid barriers which are substantially nonabsorbent and prevent localized penetration of body fluids before the absorbent intermediate filler is saturated. For example, this polyethylene films have been found quite suitable for this purpose.

Polyethylene films and other slowly biodegradable materials are objectionable, however, from the standpoint of disposability in public and private sewage disposal systems. On the other hand, biodegradable thin paper and other nonwoven wrappers for absorbent pads are not totally satisfactory barriers because of their porosity.

It is an object of this invention to provide a cellulose film barrier for disposable absorbent pads having higher biodegradability.

This and other objects are accomplished in accordance with this invention which comprises an absorbent pad having biodegradable absorbent filler material and a nonfibrous regenerated cellulose moisture barrier film containing from about 75 to about 120 percent based on the weight of the cellulose, of an organic cellulose plasticizer.

The absorbent pad can be constructed so that the barrier material separates various layers of absorbent filler, e.g. fluffed wood pulp or cellulose staple fibers, thus causing each layer to become saturated with fluid prior to penetration of the next layer. The principal use, however, of the barrier film is for wrapping the absorbent filler, at least covering those sides of the pad through which penetration of body fluids is undesirable. Fibrous tissue or gauze may be used in combination with the barrier film as a portion of the wrapper.

The regenerated cellulose films of this invention are conventionally produced by the viscose method although other processes are also suitable. The plasticizer is advantageously applied in the desired high amounts by running the wet gel film from the manufacturing operation after wet processing through a highly concentrated aqueous plasticizer bath. The cellulose film preferably has no coating on either side and at least one side must not have a coating unless it is readily water-soluble or permeable since the cellulose, for biodegradation purposes, must be accessible. The barrier film thickness will generally be from about 0.5 mil up to 5 mil and preferably from about 0.8 up to 2 mil.

The plasticizers for this invention include for example glycerol, ethylene glycol, diethylene glycol, polyethylene glycols, propylene glycols, polypropylene glycols 1,3 butylene glycol, 1,3 propanediol, urea, trimethylamine hydrochloride, 1,2,61,5-pentanediol, block copolymers of polyoxypropylene and polyoxyethylene, hexitols, oxyalkylene derivatives of hexitols, and the like. The preferred plasticizers for this invention are glycerol and higher molecular weight polyalkylene glycols because of their availability, moderate cost and absence of crystallization problems. The more preferred plasticizer materials are the polyethylene glycols having molecular weight ranges from at least about 50 up to about 700 because of a combination of properties preferred for barrier materials in sanitary napkins, i.e. low migration from the cellulose film on storage, and production of acceptably low stiffness in the film.

Because of the exceptionally high plasticizer content of the cellulose film, it is difficult to process the film on machinery for the manufacture of absorbent pads, e.g. dressings, diapers and sanitary napkins. To alleviate this problem to an acceptable degree, the film must also be loaded with particulate slip agents generally in an amount ranging from about 1 to 20 percent based on the weight of the film and preferably from about 5 to about 15 per cent.

Slip agents include, for example, microcrystalline cellulose, clays, talc, hard waxes and hard resin particles. These materials generally range in size from submicron particles to those up to 1,000 microns and higher. A preferred slip agent for this invention is microcrystalline cellulose which is also biodegradable. The slip agents are readily incorporated in the film either during manufacture or processing thereof when the film is still in the wet gel state. The slip agent can be dispersed in the plasticizer bath if desired.

Coloring agents are also incorporated in the film, if desired, for esthetic purposes.

The following procedure was used to determine the biodegradation of various material: A "Fall Apart" test consisted of suspending samples of test material over stainless steel wires in synthetic sewage contained in a tray covered with a Plexiglass lid. A portion of the sewage was drawn off daily and replaced with nutrient solution. The results were expressed as the number of days required for each test material to fall apart during the same test.

The data developed in the above test procedure is reported in the following table:

TABLE

| Test sample | Thickness, mils. | Plasticizer, percent by wt. of cellulose | Days to fall apart |
|---|---|---|---|
| (1) Uncoated R.C.[1] film | 1.55 | Glycerol, 24% | 41 |
| (2) Uncoated R.C.[1] film | 0.90 | Glycerol, 33% | 24 |
| (3) Uncoated R.C.[1] film | 1.65 | Glycerol, 40% | 32 |
| (4) Uncoated R.C.[1] film | 1.35 | Glycerol, 100% | 13 |
| (5) Uncoated R.C.[1] film | 1.35 | PEG400[2] 103% | 13 |
| (6) Filter paper[3] | 7.10 | | 10 |
| (7) Uncoated hydroxyethyl cellulose ether film. | 1.25 | Glycerol, 40% | 60 |
| (8) Uncoated cellulose acetate film | 1.00 | Not known | 60 |
| (9) Saran coated R.C.[1] film (coated one side). | 0.95 | Glycerol, 20% | 60 |

[1] Regenerated cellulose.
[2] Polyethylene glycol having an average molecular weight of about 400.
[3] Whatman No. 1, No resin or plasticizer.

It may be seen from the above data that uncoated regenerated cellulose film containing a plasticizer in conventional amounts, 24–40 percent based on weight of cellulose, equivalent to about 11–20 percent based on weight of conditioned film, falls apart in the simulated sewage test in from 24 to 41 days depending on the amount of plasticizer and to some extent on the thickness of the film. Similar film samples containing very high plasticizer content fall apart in about half the time required for the conventionally plasticized film samples.

Furthermore, filter paper, a cellulose paper which is similar in nature to the fibrous wrappers of some types of sanitary napkins falls apart very readily in this test since its porous nature permits accessibility of the sewage solution to its internal structure. This demonstrates that biodegradation is not a problem with absorbent pads utilizing fibrous cellulose wrappers as compared to those pads utilizing film barriers.

Still further, the above data demonstrates the poor biodegradability of cellulose derivative films and film coated with thermoplastic coatings. It is also well known that fluid barriers for absorbent pads such as polyethylene films have extremely poor biodegradability.

A preferred absorbent pad of this invention comprises biodegradable absorbent filler material and an uncoated nonfibrous regenerated cellulose barrier film containing from about 90 to 110 percent based on the weight of cellulose in the film, of a polyethylene glycol having an average molecular weight ranging from about 300 to 600, and from about 5 to about 15 percent, based on the weight of the film of finely divided microcrystalline cellulose.

The highly plasticized film of this invention is a satisfactory barrier for body fluids and the colored matter of these fluids. It has increased biodegradability over conventional regenerated cellulose film and more readily disintegrates with the agitation received in public sewage and septic tank systems.

I Claim:

1. A disposable absorbent pad which comprises biodegradable absorbent filler material and a nonfibrous regenerated cellulose moisture barrier film containing from about 75 to about 120 percent, based on the weight of the cellulose, of an organic cellulose plasticizer.

2. The disposable absorbent pad of claim 1 wherein the barrier film contains from 1 to 20 of a particular slip agent.

3. The disposable absorbent pad of claim 1 wherein the organic plasticizer is glycerol or a polyalkylene glycol.

4. The disposable absorbent pad of claim 1 wherein the barrier film contains from 90 to 110 percent of a polyethylene glycol having an average molecular weight range of from about 250 to about 700.

5. The disposable absorbent pad of claim 4 wherein the barrier film contains from 5 to 15 percent of a particulate slip agent.

6. A rapidly biodegradable sheet consisting essentially of a nonfibrous, regenerated cellulose film containing from about 75 to about 120 percent, based on the weight of the cellulose, of an organic plasticizer for cellulose.

7. The rapidly biodegradable sheet of claim 6 incorporating from 1 to 20 percent, based on the weight of the sheet, of a particulate slip agent.

8. The rapidly biodegradable sheet of claim 6 wherein the organic plasticizer is glycerol or a polyalkylene glycol.

9. The rapidly biodegradable sheet of claim 6 wherein the nonfibrous, regenerated cellulose film contains from 90 to 110 percent of a polyethylene glycol having an average molecular weight range of from about 250 to about 700.

UNITED STATES PATENT OFFICE
CERTIFICATE OF CORRECTION

Patent No. 3,602,225　　　　　　　　　Dated August 31, 1971

Inventor(s)　Edward A. Wielicki

It is certified that error appears in the above-identified patent and that said Letters Patent are hereby corrected as shown below:

Col. 1, line 8, "this" should read --thin--;
line 52, "1,2,61,5-pentanediol," should read
-- 1,2,6-hexanetriol, 1,5-pentanediol, --;
line 59, "50" should read --250--. Col. 3,
line 2, "20" should read -- 20% --; line 2,
"particular" should read --particulate--

Signed and sealed this 7th day of March 1972.

(SEAL)
Attest:

EDWARD M. FLETCHER, JR.
Attesting Officer

ROBERT GOTTSCHALK
Commissioner of Patents